United States Patent
Jafarkhani et al.

(10) Patent No.: US 6,891,903 B2
(45) Date of Patent: May 10, 2005

(54) MULTIPLE TRANSMIT ANTENNA DIFFERENTIAL DETECTION FROM GENERALIZED ORTHOGONAL DESIGNS

(75) Inventors: Hamid Jafarkhani, Irvine, CA (US); Vahid Tarokh, Belmont, MA (US)

(73) Assignee: AT&T Corp., New York, NY (US)

( * ) Notice: Subject to any disclaimer, the term of this patent is extended or adjusted under 35 U.S.C. 154(b) by 887 days.

(21) Appl. No.: 09/844,913

(22) Filed: Apr. 27, 2001

(65) Prior Publication Data

US 2001/0031019 A1 Oct. 18, 2001

Related U.S. Application Data

(63) Continuation-in-part of application No. 09/296,514, filed on Apr. 22, 1999, now Pat. No. 6,587,515.
(60) Provisional application No. 60/201,342, filed on May 2, 2000.

(51) Int. Cl.[7] .......................... H04L 27/04; H04L 27/12; H04L 27/20
(52) U.S. Cl. ....................... 375/299; 375/267; 375/347; 455/101; 455/132
(58) Field of Search ................................ 375/299, 308, 375/260, 267, 347, 349, 144, 148; 455/101, 103, 132, 133, 137

(56) References Cited

U.S. PATENT DOCUMENTS

| | | | | |
|---|---|---|---|---|
| 6,088,408 A | * | 7/2000 | Calderbank et al. | 375/347 |
| 6,185,258 B1 | * | 2/2001 | Alamouti et al. | 375/260 |
| 6,327,310 B1 | * | 12/2001 | Hochwald et al. | 375/259 |
| 6,363,121 B1 | * | 3/2002 | Hochwald et al. | 375/260 |
| 6,459,740 B1 | * | 10/2002 | Lo | 375/259 |
| 6,584,593 B1 | * | 6/2003 | Seshadri et al. | 714/752 |
| 6,643,338 B1 | * | 11/2003 | Dabak et al. | 375/347 |
| 6,693,982 B1 | * | 2/2004 | Naguib et al. | 375/341 |
| 6,741,635 B2 | * | 5/2004 | Lo et al. | 375/144 |
| 6,807,240 B2 | * | 10/2004 | Alamouti et al. | 375/341 |

FOREIGN PATENT DOCUMENTS

EP 0938194 A2 8/1999

OTHER PUBLICATIONS

Wittneben, A., "Basestation Modulation Diversity for Digital SIMULCAST", IEEE, 1991, pp. 848–852.
Hochwald, B.M., et al., "Unitary Space–Time Modulation for Multiple–Antenna Communications in Rayleigh Flat Fading", IEEE Trans. on Information Theory, vol. 46, No. 2, Mar. 2000.

* cited by examiner

*Primary Examiner*—Phuong Phu
(74) *Attorney, Agent, or Firm*—Henry T. Brendzel

(57) ABSTRACT

A differential detection approach allows communication without knowing the channel parameters, where the transmitter can include a plurality of transmitting antennas in excess of two. In the transmitter, each block of bits is mapped to a vector that is processed to develop a symbols vector, by employing mutually orthogonal vectors and the symbols vector of the previous block. The symbols vector is applied to a space-time mapping block, and thence to transmitting antennas. At the receiver, the received signals of a block are formed into vector, which is combined with a corresponding vector from the previous block in accordance with the mutually orthogonal vectors. The combined vector is summed with combined vectors of the other receive antennas, and the summed result is applied to a minimum distance decoder module. The decoder module selects a "most likely" vector, and that vector is applied to a mapping that recovers the transmitted bits.

15 Claims, 1 Drawing Sheet

MULTIPLE TRANSMIT ANTENNA DIFFERENTIAL DETECTION FROM GENERALIZED ORTHOGONAL DESIGNS

RELATED APPLICATIONS

This is a continuation-in-part application of an application that bears the Ser. No. 09/296,514, which was filed on Apr. 22, 1999 now U.S. Pat. No. 6,587,515, and which is incorporated by reference herein. This application also claims priority from Provisional Application 60/201,342, filed May 2, 2000.

BACKGROUND

This invention relates to space-time coding and, more particularly, it relates to space-time coding and transmission in an environment that has no knowledge of the transmission channel parameters.

Hocwald and Marzetta, in "Unitary space-time modulation for multiple-antenna communications in Rayleigh flat fading," IEEE Trans. Inform. Theory, March 2000, proposed unitary space-time codes with interesting codes, but they have exponential encoding and decoding complexity. Subsequently, they came up with a second construction that has polynomial encoding but exponential decoding complexity, which makes their use formidable in practical situations. In the aforementioned Ser. No. 09/296,514 patent application, we proposed a coding scheme based on orthogonal designs, it being the first scheme that provides simple encoding/decoding algorithms. Thereafter, Hughes introduced a construction based on group codes that also has simple encoding/decoding algorithms, and Hocwald, et al. presented a construction with polynomial encoding but with a suboptimal decoding algorithm.

This disclosure is provided because the parent application discloses an arrangement where two transmitting antennas are employed and at least to some artisans questioned whether the arrangement can be expanded to more than two antennas.

SUMMARY

A differential detection approach allows communication without knowing the channel parameters, where the transmitter can include a plurality of transmitting antennas in excess of two. Each block of bk bit is mapped to a vector and the vector is processed to develop a set of symbols for the block, by employing a set of mutually orthogonal vectors and symbols developed for the immediately previous block. The set of symbols is then applied to a space-time mapping block, which develops signals that are applied to the plurality of transmitting antennas.

At the receiver, for each receive antenna the received signals of a block are formed into vector. That vector, and a corresponding vector of the immediately previous block are processed in accordance with the mutually orthogonal vectors used by the receiver to create a combined vector. The combined vector is summed with combined vectors developed for the received signals of the other receive antennas, and the summed result is applied to a minimum distance decoder module. The decoder module selects a "most likely" vector, and that vector is applied to a mapping that is the inverse of the mapping used at the input of the transmitter.

DETAILED DESCRIPTION

Figure 1:
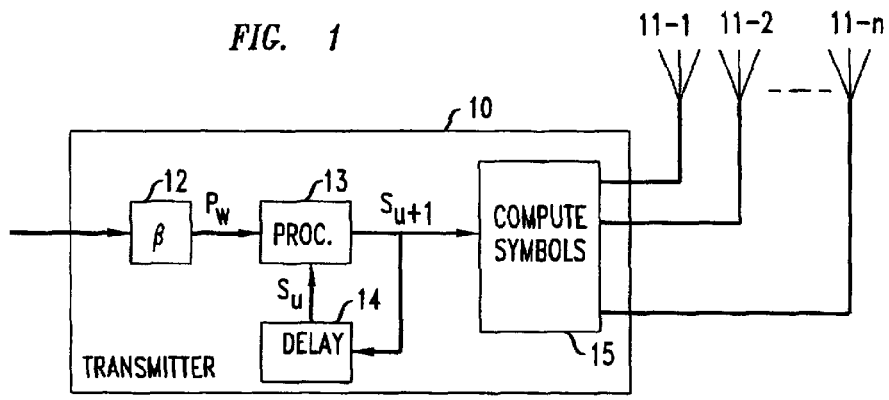
FIG. 1 presents a block diagram a transmitter in accord with the principles of this invention.
Figure 2:
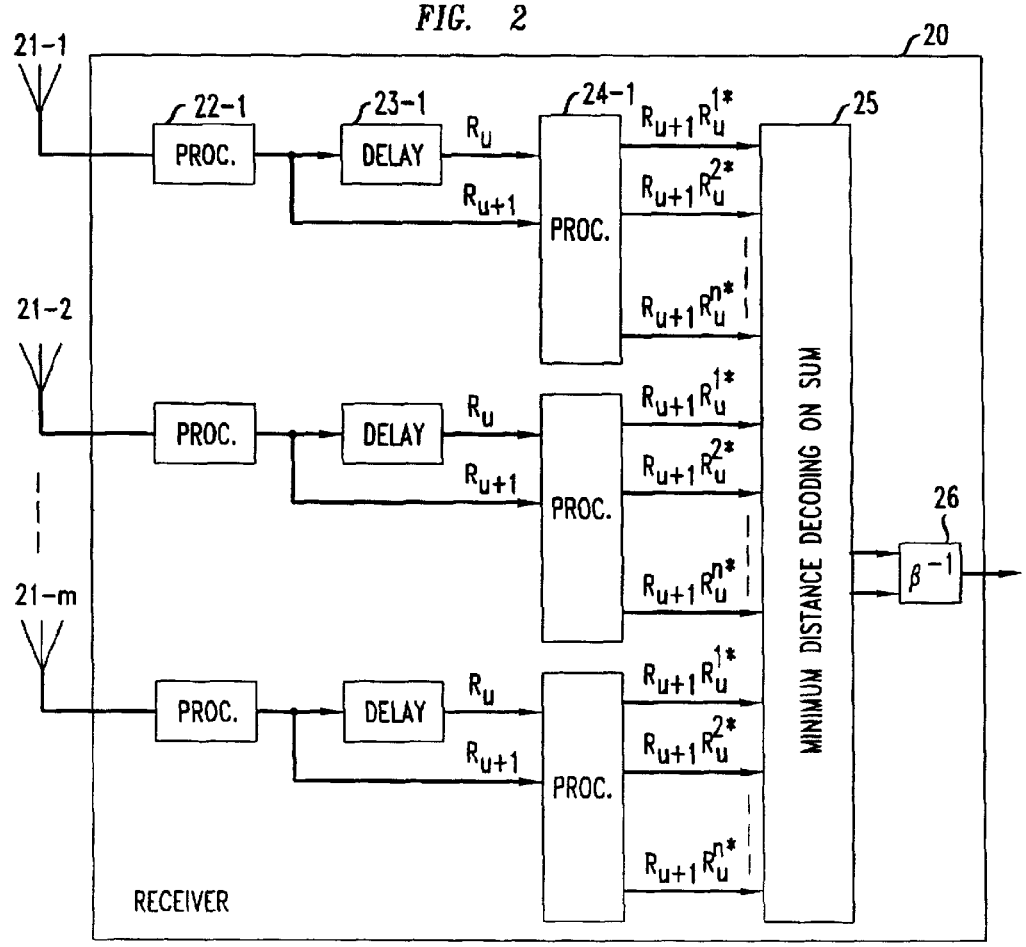
FIG. 2 presents a block diagram of a receiver in accord with the principles of this invention.

The following considers a multiple antenna, wireless, communication system like the one depicted in FIG. 1, under the assumption that fading is quasi-static and flat, where a base station 10 is equipped with n transmitting antennas and a remote receiver is equipped with in receiving antennas. At each time slot t, signals $c_{t,i}$, i=1,2, . . . , n are transmitted simultaneously from the n transmit antennas. The coefficient $\alpha_{i,j}$ is the path gain from transmit antenna i to receive antenna j. The path gains are modeled as samples of independent complex Gaussian random variables with variance 0.5 per real dimension. The wireless channel is assumed to be quasi-static so that the path gains are constant over a frame and only vary (if at all) from one frame to another.

At time t the signal $r_{t,j}$, received at antenna j, is given by $$r_{t,j} = \sum_{i=1}^{n} \alpha_{i,j} c_{t,i} + \eta_{t,j}, \tag{1}$$

where $\eta_{t,j}$ represents noise samples. The average energy of the symbols transmitted from each antenna ($c_{t,i}$) is normalized to be 1/n, so that the average power of the received signal at each receive antenna is 1 and the signal to noise ratio is SNR.

When block encoding is employed, a block of information bits that arrives in p time slots is converted to k symbols that are mapped via a space-time block code onto constellation points and transmitted over the n transmitting antennas over the p time slots. The receiver receives the transmitted signals and, assuming coherent detection, computes the decision metric $$\sum_{t=1}^{p} \sum_{j=1}^{m} \left| r_{t,j} - \sum_{i=1}^{n} \alpha_{i,j} c_{i,j} \right|^2,$$

over all codewords $$c_{1,1} c_{1,2} \ldots c_{1,n} c_{2,1} c_{2,2} \ldots c_{2,n} \ldots c_{p,1} c_{p,2} \ldots c_{p,n}$$

and decides in favor of the codeword that minimized the equation (2) is sum.

Encoding in Transmitter 10

A space-time block code is defined, therefore, by a p×n transmission matrix G (p being the number of time slots in a block, and n being the number of transmitting antennas). In the context of this disclosure, the entries of the matrix G are linear combinations of variables $x_1, x_2, \ldots x_k$, and their conjugates, such that the matrix G satisfies the equality $$G^*G = (|x_1|^2 + |x_2|^2 + \ldots + |x_k|^2) I_n \tag{3}$$

where $I_n$ is the n×n identity matrix. For example, $G_{S4}$ represents an arrangement that employs blocks of eight time slots each, utilizes four transmit antennas, and may have to form defined by:

$$G_{84} = \begin{pmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \\ x_1^* & x_2^* & x_3^* & x_4^* \\ -x_2^* & x_1^* & -x_4^* & x_3^* \\ -x_3^* & x_4^* & x_1^* & -x_2^* \\ -x_4^* & -x_3^* & x_2^* & x_1^* \end{pmatrix} \quad (4)$$

See, for example, U.S. Pat. No. 6,088,408 issued Jul. 11, 2000; and particular, see equations (27 and (28), which demonstrate a G matrix with linear combinations. When the transmission employs a signal constellation with $2^b$ elements, the encoding of each block begins with the collection of kb input bits, whereupon the encoder selects k constellation signals $s_1, \ldots s_k$ for the block. Setting $x_l = s_l$ for $l=1,2,\ldots,k$ in G, we arrive at a matrix C with entries that are linear combinations of $s_1, s_2, \ldots s_k$ and their conjugates.

Thus, while G contains indeterminates $x_1, x_2, \ldots x_k$, matrix C contains specific constellation symbols (or their linear combinations), which are transmitted from n antennas as follows. If $c_{t,i}$ represents the element in the $t^{th}$ row and the $i^{th}$ column of C, the entries $c_{t,i}, i=1,2,\ldots,n$ are transmitted simultaneously from transmit antennas $1,2,\ldots,n$ at each time slot $t=1,2,\ldots,p$. Hence, the $i^{th}$ column of C represents the transmitted symbols from the $i^{th}$ antenna and the $t^{th}$ row of C represents the transmitted symbols at time slot t. Note that C is basically defined using G, and the orthogonality of G columns (i.e., the attribute of equation (3)) allows the simple decoding scheme disclosed herein. Since p time slots are used to transmit k symbols, one can define the rate of the code to be k/p. For example, the rate for the illustrated $G_{84}$ is ½.

Decoding in Receiver 20

Next, we consider the decoding algorithm. It can be shown that, because G is orthogonal, the decision metric in equation (2) is the sum of k components each involving only the variable $x_l$, $l=1,2,\ldots,k$; i.e., each independently involving one of the k transmitted symbols. It can be further shown that each component can be computed using only linear processing. See, V. Tarokh, J. Jafarkhani and A. R. Calderbank, "Space-time block codes from orthogonal designs," IEEE Trans. Inform. Theory, Vol. 45, No. 5, pp. 1456–1467, July 1999. Therefore, this is a very simple decoding strategy that provides diversity.

Differential Encoding

Employing, for example, $G_{84}$ and only one receive antenna, the received signal of that one antenna, $r_{t,1}$, which can be noted by $r_t$, is related to the constellation symbols $s_1, s_2, s_3, s_4$ by $$\begin{aligned} r_1 &= \alpha_1 s_1 + \alpha_2 s_2 + \alpha_3 s_3 + \alpha_4 s_4, \\ r_2 &= -\alpha_1 s_2 + \alpha_2 s_1 - \alpha_3 s_4 + \alpha_4 s_3, \\ r_3 &= -\alpha_1 s_3 + \alpha_2 s_4 + \alpha_3 s_1 - \alpha_4 s_2, \\ r_4 &= -\alpha_1 s_4 - \alpha_2 s_3 + \alpha_3 s_2 + \alpha_4 s_1, \\ r_5 &= \alpha_1 s_1^* + \alpha_2 s_2^* + \alpha_3 s_3^* + \alpha_4 s_4^*, \\ r_6 &= -\alpha_1 s_2^* + \alpha_2 s_1^* - \alpha_3 s_4^* + \alpha_4 s_3^*, \\ r_7 &= -\alpha_1 s_3^* + \alpha_2 s_4^* + \alpha_3 s_1^* - \alpha_4 s_2^*, \\ r_8 &= -\alpha_1 s_4^* - \alpha_2 s_3^* + \alpha_3 s_2^* + \alpha_4 s_1^*, \end{aligned} \quad (5)$$

(ignoring noise terms), or $$(r_1 r_2 r_3 r_4 r_5^* r_6^* r_7^* r_8^*) = (s_1 s_2 s_3 s_4) \Omega, \quad (6)$$

where $$\Omega = \begin{pmatrix} \alpha_1 & \alpha_2 & \alpha_3 & \alpha_4 & \alpha_1^* & \alpha_2^* & \alpha_3^* & \alpha_4^* \\ \alpha_2 & -\alpha_1 & -\alpha_4 & \alpha_3 & \alpha_2^* & -\alpha_1^* & -\alpha_4^* & \alpha_3^* \\ \alpha_3 & \alpha_4 & -\alpha_1 & -\alpha_2 & \alpha_3^* & \alpha_4^* & -\alpha_1^* & -\alpha_2^* \\ \alpha_4 & -\alpha_3 & \alpha_2 & -\alpha_1 & \alpha_4^* & -\alpha_3^* & \alpha_2^* & -\alpha_1^* \end{pmatrix}. \quad (7)$$

In other words, a vector comprising a the set of received signals of a transmitted block of signals, that are processed somewhat (in this case, the last four received signals being conjugated), is related to a vector comprising the constellation symbols that were encoded with matrix $G_{84}$ (the vector $s_1 s_2 s_3 s_4$) multiplied by a matrix ($\Omega$) that is related to the transmission medium's coefficients. It is noted that the equation (6) relationship is not the only one that is possible and that the following equations also hold $$\begin{aligned} (-r_2 r_1 r_4 - r_3 - r_6^* r_5^* r_8^* - r_7^*) &= (s_2 - s_1 s_4 - s_3)\Omega, \\ (-r_3 - r_4 r_1 r_2 - r_7^* - r_8^* r_5^* r_6^*) &= (s_3 - s_4 - s_1 s_2)\Omega, \\ (-r_4 r_3 - r_2 r_1 - r_8^* r_7^* - r_6^* r_5^*) &= (s_4 s_3 - s_2 - s_1)\Omega. \end{aligned} \quad (8)$$

It is also noted that if the set of constellation symbols $s_1, s_2, s_3, s_4$ is denoted by S, one can rewrite equation (8) as:

$$\begin{aligned} (r_1 r_2 r_3 r_4 r_5^* r_6^* r_7^* r_8^*) &= v_1(S)\Omega \\ (-r_2 r_1 r_4 - r_3 - r_6^* r_5^* r_8^* - r_7^*) &= v_2(S)\Omega, \\ (-r_3 - r_4 r_1 r_2 - r_7^* - r_8^* r_5^* r_6^*) &= v_3(S)\Omega, \\ (-r_4 r_3 - r_2 r_1 - r_8^* r_7^* - r_6^* r_5^*) &= v_4(S)\Omega. \end{aligned} \quad (9)$$

where $v_1(S)=(s_1\ s_2\ s_3\ s_4)^r$, $v_2(S)=(s_2-s_1\ s_4-s_3)^r$, $v_3(S)=(s_3-s_4-s_1\ s_2)^r$ and $v_4(S)=(s_4 s_3-s_2-s_1)^r$. It is noted further that the four vectors, $v_1, v_2, v_3$, and $v_4$, are orthogonal to each other. The number of such vectors is equal to the number of columns in the G matrix, which is equal to the number of transmitting antennas.

The thrust of this disclosure is that, at each block, the symbols that are applied to the G matrix are related to the symbols applied to the G matrix in the previous block and to the input data. Basically, it is an encoding system that includes feedback around the G matrix.

Assuming that we want to employ k symbols to transmit M=bk bits per block (i.e., frame), we define a set $\mathcal{P}$ that consists of $2^{bk}$ unit-length vectors $P_1, P_2, \ldots, P_{2^{bk}}$ where each vector $P_w$ is a k×1 vector of real numbers, $P_w=(P_{w1}\ P_{w2}\ \ldots, P_{wk})^r$. That is, the set $\mathcal{P}$ consists of $2^{bk}$ constellation points that lie on a k-dimensional unit circle, which allows any arbitrarily chosen one-to-one mapping β to be defined that maps the bk bits of a block onto $\mathcal{P}$. That is, an input set of kb bits maps to, or specifies, a vector $P_w$, where the subscript w is between 1 and $2^{bk}$, inclusively.

The encoding is done by first calculating a k-dimensional vector of symbols $S=(s_1 s_2 \ldots s_k)^r$, employing a chosen mapping. Then, indeterminates $x_1 x_2 \ldots x_k$ in G are replaced by symbols $s_1, s_2, \ldots s_k$, to establish the matrix C, which is used for transmission in a manner similar to a regular space-time block code. That is what the first block transmits. What remains, now, is to calculate $S=(s_1 s_2 \ldots s_k)^r$ for subsequent blocks so that non-coherent detection is possible.

If $S_u$ is the vector of constellation k points that is used for the $u^{th}$ block of bk bits, then $C(S_u)$ is a matrix that defines what to transmit from each antenna during the transmission of the $u^{th}$ block. $C_i(S_u)$, $i=1,2,\ldots,n$ is the $i^{th}$ column of $C(S_u)$ and it contains p symbols which are transmitted from the $i^{th}$ antenna sequentially (in p time slots). Given an input of bk bits in block u, the vector $P_w$ is specified by the β mapping described above, in accordance with the principles of this invention the next set of symbols $S=(s_1 s_2 \ldots s_k)^r$, for block u+1, is given by:

$$S_{u+1} = P_{w1}v_1(S_u) + P_{w2}v_2(S_n) + P_{w3}v_3(S_u) + \ldots + P_{wk}v_k(S_u) \quad (10)$$

$$S_{u+1} = \sum_{l=1}^{k} P_{wl}v_l(S_u)$$

where the $P_{w1}$ term is the ith element (dimension) of the vector $P_w$ (that is the mapped input data).

Differential Decoding

Recalling that the received signal, $r_t$, is related to the transmitted signals by $$r_t = \sum_{i=1}^{n} \alpha_i c_{t,i} \quad (11)$$

(ignoring the noise), and defining $$R=(r_1 r_2 \ldots r_k r_{k+1}^* r_{k+2}^* \ldots r_{2k}^*), \quad (12)$$

which assumes p=2k—as is the case in $G_{84}$—by using equation (11) one can write R in terns of the vector S which is used to define the transmitted signals, as follows $$R=S^r\Omega(\alpha_1,\alpha_2,\ldots,\alpha_n), \quad (13)$$

(see equation (4)) or $$R=S^r(\Lambda(\alpha_1,\alpha_2,\ldots,\alpha_n)|\Lambda(\alpha_1^*,\alpha_2^*,\ldots,\alpha_n^*)) \quad (14)$$

where the "|" designates concatenation of adjacent matrices, and $\Lambda(\alpha_1,\alpha_2,\ldots\alpha_n)$ is the n×n matrix $$\Lambda = \begin{pmatrix} \alpha_1 & \alpha_2 & \alpha_3 & \alpha_4 \\ \alpha_2 & -\alpha_1 & -\alpha_4 & \alpha_3 \\ \alpha_3 & \alpha_4 & -\alpha_1 & -\alpha_2 \\ \alpha_4 & -\alpha_3 & \alpha_2 & -\alpha_1 \end{pmatrix} \quad (15)$$

Recalling that $S_u$ and $S_{u+1}$ are used for the $u^{th}$ and $(u+1)^{st}$ blocks of bk bits, respectively. Using $G_{S4}$, for each block of data we receive 8 signals. To simplify the notation, we denote the received signals corresponding to the $u^{th}$ block by $r_1^u, r_2^u, \ldots r_8^u$ and the received signals corresponding to the $(u+1)^{st}$ block by $r_1^{v+1}, r_2^{v+1}, \ldots r_8^{v+1}$. Let us With reference to equations (9) and (13) one can construct the vectors $$R_u^1=(r_1^u r_2^u r_3^u r_4^u r_5^{u*} r_6^{u*} r_7^{u*} r_8^{u*}),$$

$$R_u^2=(-r_2^u r_1^u r_4^u -r_3^u -r_6^{u*} r_5^{u*} r_8^{u*} -r_7^{u*}),$$

$$R_u^3=(-r_3^u -r_4^u r_1^u r_2^u -r_7^{u*} -r_8^{u*} r_5^{u*} r_6^{u*}),$$

$$R_u^4=(-r_4^u r_3^u -r_2^u r_1^u -r_8^{u*} r_7^{u*} -r_6^{u*} r_5^{u*}), \quad (16)$$

where $r_1^u, r_2^u, \ldots r_8^u$ are the signals that are received at the $u^{th}$ block, and also observe that $R_u^q = v_q(S_u)^r \Omega$. It can also be shown that $$\Omega\Omega^* = 2\sum_{i=1}^{n}|\alpha_i|^2 I_K$$

and, this allows one to determine that if the product $R_{u+1}R_u^{q*}$ is to be developed, its value is:

$$R_{u+1}R_u^{q*} = S_{u+1}^T \Omega\Omega^* v_q(S_u)^{*T} \quad (17)$$

$$= 2\sum_{i=1}^{4}|\alpha_i|^2 S_{u+1}^T v_q(S_u)^{*T}$$

Recalling that the four vectors, $v_1$, $v_2$, $v_3$, and $v_4$, are orthogonal to each other, and how is constructed in equation (10), results in $$R_{u+1}R_u^{q*} = 2\sum_{i=1}^{4}|\alpha_i|^2 P_{wq} \quad (18)$$

where q is 1, 2, 3, or 4 in the above example. Therefore, one can construct a vector $\mathcal{R}$ $$\mathcal{R} = (R_{u+1}R_u^{1*} R_{u+1}R_u^{2*} R_{u+1}R_u^{3*} R_{u+1}R_u^{4*}) \quad (19)$$

$$= \left(2\sum_{i=1}^{4}|\alpha_i|^2 P_{w1} \quad 2\sum_{i=1}^{4}|\alpha_i|^2 P_{w2} \quad 2\sum_{i=1}^{4}|\alpha_i|^2 P_{w3} \quad 2\sum_{i=1}^{4}|\alpha_i|^2 P_{w4}\right)$$

$$= \left(2\sum_{i=1}^{4}|\alpha_i|^2\right)(P_{w1} \quad P_{w2} \quad P_{w3} \quad P_{w4})$$

$$= \left(2\sum_{i=1}^{4}|\alpha_i|^2\right)P_{w^*}$$

Because the elements of $\mathcal{P}$ (i.e., the $P_w$ vectors) have equal length, to compute $P_K$, the receiver can compute the closet vector of $\mathcal{P}$ to $\mathcal{R}$. Once this vector is computed, the inverse mapping of β is applied and the transmitted bits are recovered.

From the resemblance of equation (19) to analogous formula for maximum ratio combining, it can be shown mathematically that the above detection method provides 4-level diversity assuming 4 transmit and one receive antennas. However, the following physical argument also demonstrates this fact. For the multiplicative coefficient $$\sum_{i=1}^{4} |\alpha_i|^2$$

in equation (19) to be small, which corresponds to a failure to receive the sent signal, all $|\alpha_i|$, i=1,2,3,4 have to be small. In other words, all sub-channels from the four transmit antennas to the receive antenna must undergo fading. Conversely, one can say that the decoder suffers from the detrimental effect of fading only if all of the four sub-channels have small path gains. This is equivalent to saying that a 4-level diversity has been achieved.

The same procedure can be used for more than one receive antenna. For each receive antenna j, we compute $\mathcal{P}^j$ using the method disclosed above for $\mathcal{P}$, assuming as if only receiver antenna j exists. Then the closest vector of $\mathcal{P}$ to $$\sum_{j=1}^{m} \mathcal{R}^j$$

(multiplied by a normative constant) is computed. Subsequently, the transmitted bits are computed by applying the inverse mapping of β.

The above example demonstrates a situation where n=k. When the number of transmit antennas is less than the number of symbols, n<k, the same approach works; however, some of the details are different. In what follows we consider an example where three transmit antennas, with the space-time block code being:

$$G_{83} = \begin{pmatrix} x_1 & x_2 & x_3 \\ -x_2 & x_1 & -x_4 \\ -x_3 & x_4 & x_1 \\ -x_4 & -x_3 & x_2 \\ x_1^* & x_2^* & x_3^* \\ -x_2^* & x_1^* & -x_4^* \\ -x_3^* & x_4^* & x_1^* \\ -x_4^* & -x_3^* & x_2^* \end{pmatrix}. \quad (20)$$

When there is only one receive antenna, m=1, the received signals are related to the constellation symbols $s_1$, $s_2$, $s_3$, $s_4$ by $$\begin{aligned} r_1 &= \alpha_1 s_1 + \alpha_2 s_2 + \alpha_3 s_3, \\ r_2 &= -\alpha_1 s_2 + \alpha_2 s_1 - \alpha_3 s_4, \\ r_3 &= -\alpha_1 s_3 + \alpha_2 s_4 + \alpha_3 s_1, \\ r_4 &= -\alpha_1 s_4 - \alpha_2 s_3 + \alpha_3 s_2, \\ r_5 &= -\alpha_1 s_1^* + \alpha_2 s_2^* + \alpha_3 s_3^*, \\ r_6 &= -\alpha_1 s_2^* + \alpha_2 s_1^* - \alpha_3 s_4^*, \\ r_7 &= -\alpha_1 s_3^* + \alpha_2 s_4^* + \alpha_3 s_4^*, \\ r_8 &= -\alpha_1 s_4^* - \alpha_2 s_3^* + \alpha_3 s_2^*. \end{aligned} \quad (21)$$

One may rearrange the above equations to arrive at $$(r_1 r_2 r_3 r_4 r_5^* r_6^* r_7^* r_8^*) = (s_1 s_2 s_3 s_4)\Omega, \quad (22)$$

where $$\Omega = \begin{pmatrix} \alpha_1 & \alpha_2 & \alpha_3 & 0 & \alpha_1^* & \alpha_2^* & \alpha_3^* & 0 \\ \alpha_2 & -\alpha_1 & 0 & \alpha_3 & \alpha_2^* & -\alpha_1^* & 0 & \alpha_3^* \\ \alpha_3 & 0 & -\alpha_1 & -\alpha_2 & \alpha_3^* & 0 & -\alpha_1^* & -\alpha_2^* \\ 0 & -\alpha_3 & \alpha_2 & -\alpha_1 & 0 & -\alpha_3^* & \alpha_2^* & -\alpha_1^* \end{pmatrix}. \quad (23)$$

One may simply check that Ω for $G_{83}$ can be calculated from Ω for $G_{84}$, equation (7), by setting $\alpha_4=0$. Therefore, again for each specific constellation symbols S, vectors $v_1(S)$, $v_2(S)$, $v_3(S)$, $v_4(S)$ can create a basis for the 4-dimensional space of any arbitrary 4-dimensional constellation symbols and the same encoding and decoding schemes are applicable. The only difference in the final result is that $$\sum_{i=1}^{4} |\alpha_i|^2$$

is replaced by $$\sum_{i=1}^{3} |\alpha_i|^2$$

as follows:

$$\mathcal{R} = (R_{u+1} R_u^{1*} R_{u+1} R_u^{2*} R_{u+1} R_u^{3*} R_{u+1} R_u^{4*}) \quad (24)$$

$$= \left(2 \sum_{i=1}^{3} |\alpha_i|^2\right) P_w.$$

Therefore, a 3-level diversity is achieved using three transmit antennas and $G_{83}$ as expected.

We have assumed rate half space-time block codes that can be applied to any complex constellation set. If the constellation set is real, rate one space-time block codes are available and the same approach works. For example, in the case of p=k=4, the following space-time block code exists for n=4:

$$G = \begin{pmatrix} x_1 & x_2 & x_3 & x_4 \\ -x_2 & x_1 & -x_4 & x_3 \\ -x_3 & x_4 & x_1 & -x_2 \\ -x_4 & -x_3 & x_2 & x_1 \end{pmatrix}. \quad (25)$$

It can be shown that $$(r_1 r_2 r_3 r_4 r_1^* r_2^* r_3^* r_4^*) = (s_1 s_2 s_3 s_4)\Omega, \quad (26)$$

where Ω is defined by equation (7). Similar differential encoding and decoding are possible if we use the following vectors for $R_u^I$, I=1,2,3,4 and $R_{u+1}$:

$$R_u^1 = (r_1^u \; r_2^u \; r_3^u \; r_4^u \; r_1^{u*} \; r_2^{u*} \; r_3^{u*} \; r_4^{u*}), \quad (27)$$

$$R_u^2 = (-r_2^u \; r_1^u \; r_4^u \; -r_3^u \; -r_2^{u*} \; r_1^{u*} \; r_4^{u*} \; -r_3^{u*}),$$

$$R_u^3 = (-r_3^u \; -r_4^u \; r_1^u \; r_2^u \; -r_3^{u*} \; -r_4^{u*} \; r_1^{u*} \; r_2^{u*}),$$

$$R_u^4 = (-r_4^u \; r_3^u \; -r_2^u \; r_1^u \; -r_4^{u*} \; r_3^{u*} \; -r_2^{u*} \; r_1^{u*}),$$

and $$R_{u+1} = (r_1^{u+1} r_2^{u+1} r_3^{u+1} r_4^{u+1} r_1^{(u+1)*} r_2^{(u+1)*} r_3^{(u+1)*} r_4^{(u+1)*}), \quad (28)$$

This results in a full-diversity, full-rate, scheme for differential detection.

In consonance with the above developments, a transmitter in accordance with the principles disclosed herein comprises a mapping module 12 that gathers blocks of bk bit and maps them to vectors $P_w$. Those vectors are applied to processing element 13 that develops the vector $S_{u+1}$, with the help of vector $S_u$, which is derived from the output of processing element 13, delayed by one block in element 14. The output of processing element 13 is applied to block 15, which computes the symbol in accordance with a selected space-time mapping, such as $G_{84}$, and applies the results to a antennas 11-1 through 11-n.

At the receiver, for each receive antenna (e.g., antenna 21-1) the received signals of a block are formed into vector $R_u$, for example (e.g., in element 22-1), and with a delay element (e.g., 23-1) the signals $R_{u+1}$ and $R_u$ are developed. Those signals are applied to a processor (e.g., 24-1) where the products $R_{u+1}R_u^{1*}$, $R_{u+1}R_u^{2*}$, ... $R_{u+1}R_u^{u*}$ are computed, which form the vector $\mathcal{R}^1$ for processor 24-1

(and, generally, $\mathcal{R}^j$ terms are computed in the processors 24, where j=1, 2, ... m). The different $\mathcal{R}^j$ terms are formed and summed in element 25 to form $$\sum_{j=1}^{m} \mathcal{R}^j$$

and minimum distance decoding results in a detected $P_w$ vector. Lastly, the detected $P_w$ vector is applied to inverse mapping circuit 26, which recovers bk bits for the transmitted block.

We claim:

1. A method for encoding signals to be transmitted from a plurality of transmitting antennas comprising the steps of:
    mapping a block of bits, having a duration T, into a first vector;
    processing said vector with a set of mutually orthogonal vectors and a delayed symbols vector to develop a current symbols vector;
    delaying said current symbols vector by said duration T;
    mapping said current symbols vector with a space time coder to develop a plurality of signals; and
    applying said plurality of signals to said plurality of antennas.

2. The method of claim 1 where said plurality of transmitting antenna comprises more than one antenna.

3. The method of claim 1 where said plurality of transmitting antennas comprises more than two antennas.

4. The method of claim 1 where said duration T has p time slots, said mapping develops p sets of n signals, and said step of applying applies a different one of said sets on n signals during each of said p time slots.

5. The method of claim 4 where said step of processing computes, $$S_{u+1} = \sum_{l=1}^{k} P_{wl} v_l(S_u),$$

where $P_w$ is said fast vector, $P_{w1}$ is the $l^{th}$ element of $P_w$, and the sequences $v_1(S_u), v_2(S_u), \ldots v_k(S_u)$ belong to said set of mutually orthogonal vectors.

6. The method of claim 5 where k=4, and said mutually orthogonal vectors are $v_1(S)=(s_1\ s_2\ s_3\ s_4)^r$, $v_2(S)=(s_2-s_1\ s_4-s_3)^r$, $v_3(S)=(s_3-s_4-s_1\ s_2)^r$ and $v_4(S)=(s_4 s_3-s_2-s_1)^r$, S being a vector that is applied to said mutually orthogonal vectors.

7. The method of claim 5 where k=3, and said mutually orthogonal vectors are any three of $v_1(S)=(s_1\ s_2\ s_3\ s_4)^r$, $v_2(S)=(s_2-s_1\ s_4-s_3)^r$, $v_3(S)=(s_3-s_4-s_1\ s_2)^r$ and $v_4(S)=(s_4 s_3-s_2-s_1)^r$, S being a vector that is applied to said mutually orthogonal vectors.

8. The method of claim 1 where said space time coder employs a complex constellation set and develops a transmission rate of one half.

9. The method of claim 1 where said space time coder employs a real constellation set and develop a transmission rate of one.

10. A method for receiving signals that were transmitted in accordance with a claim 1, comprising the steps of:
    receiving signals in blocks;
    processing signals to develop a first vector, $R_u$, for each block u;
    developing a vector $\mathcal{R}$ having n elements $R_{u+1}R_u^{q*}$, where $R_u^q$ corresponds to $R_u$ processed with sequence $v_q(R_u)$, which is a $q^{th}$ member of a set of receiver sequences that are mutually orthogonal, for all values of q=1, 2, ..., n, where n is a preselected number;
    performing minimum distance detection on said vector $\mathcal{R}$ to develop therefrom a vector P; and
    applying a mapping to said vector P to obtain a block of bits.

11. The method of claim 10 where n equals number of antennas in said plurality of transmitting antennas.

12. The method of claim 10 where said mutually orthogonal receiver sequences are the same as the orthogonal vectors employed in said method of claim 1.

13. A method for receiving signals that were transmitted in accordance with claim 1, comprising the steps of:
    receiving signals in blocks in each of an m plurality of receiving antenna;
    processing signals of each receiving antenna to develop a first vector, $R_u$, associated with said each receiving antenna, for each block u;
    developing a vector $\mathcal{R}^j$ for each receiving antenna, j, said vector having n elements $R_{u+1}R_u^{q*}$, where $R_u^q$ corresponds to said first vector $R_u$ processed with sequence $v_q(R_u)$, which is a $q^{th}$ member of a set of receiver sequences that are mutually orthogonal, for all values of q=1, 2, ..., n, where n is a preselected number, thus developing m $\mathcal{R}^j$ vectors;
    summing said m $\mathcal{R}^j$ vectors to obtain a summed vector $\mathcal{R}$;
    performing minimum distance detection on said vector $\mathcal{R}$ to develop therefrom a vector P; and
    applying a mapping to said vector P to obtain a block of bits.

The method of claim 10 where said m>1 where said step of receiving is receiving blocks of signals in each of a plurality of receiving antennas, and said step of developing a vector.

14. A method for receiving signals that were transmitted in accordance with claim 1 by a transmitter having more than two transmitting antennas, comprising the steps of:
    receiving, through m receiving antennas, where m=1 or more, signals in blocks;
    detecting signals transmitted in each block by processing received signals of said each block with aid of processed signals of immediately previous block.

15. The method of claim 14 where said step of detecting excludes consideration of parameters between said transmitting antennas and said receiving antennas.

* * * * *